(12) United States Patent
Schneider

(10) Patent No.: US 8,261,203 B2
(45) Date of Patent: Sep. 4, 2012

(54) FLEXIBLE SYSTEM MONITORING USING SNMP

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 786 days.

(21) Appl. No.: 12/038,617

(22) Filed: Feb. 27, 2008

(65) Prior Publication Data

US 2009/0217162 A1     Aug. 27, 2009

(51) Int. Cl.
*G06F 3/14* (2006.01)
*G06F 3/17* (2006.01)

(52) U.S. Cl. ............ 715/772; 715/503; 709/223; 700/9; 700/83; 370/401

(58) Field of Classification Search .................. 370/401, 370/467; 715/200–277, 700–867, 503; 709/201–229; 705/50–79; 345/30–111; 348/206–231.9; 707/1–10, 100–104.1, 200–206; 700/9, 83
See application file for complete search history.

(56) References Cited

U.S. PATENT DOCUMENTS

| | | | |
|---|---|---|---|
| 2001/0052006 A1* | 12/2001 | Barker et al. | 709/223 |
| 2002/0032761 A1* | 3/2002 | Aoyagi et al. | 709/223 |
| 2004/0204778 A1* | 10/2004 | Lalapeth et al. | 700/83 |
| 2005/0013310 A1* | 1/2005 | Banker et al. | 370/401 |
| 2006/0224946 A1* | 10/2006 | Barrett et al. | 715/503 |
| 2009/0210071 A1* | 8/2009 | Agrusa et al. | 700/9 |

* cited by examiner

*Primary Examiner* — Ruay Ho
(74) *Attorney, Agent, or Firm* — Lowenstein Sandler PC

(57) ABSTRACT

A method and apparatus for generating and managing simple network management protocol (SNMP) reports that support the retrieval and processing of tabular data. An SNMP management station or similar program provides a user with an interface for viewing and managing data and resources through SNMP. The data and resources are identified by object identifiers (OID). However, some data referenced by the OIDs is tabular data. The management station provides an interface and set of functions for the configuration of methods for processing and displaying the tabular data. The SNMP management station provides a set of functions including: summation, maximums, minimums, averaging, threshold checks, value comparisons and similar functions that can be applied to the tabular data and used to generate a result or indicator in a management report.

21 Claims, 5 Drawing Sheets

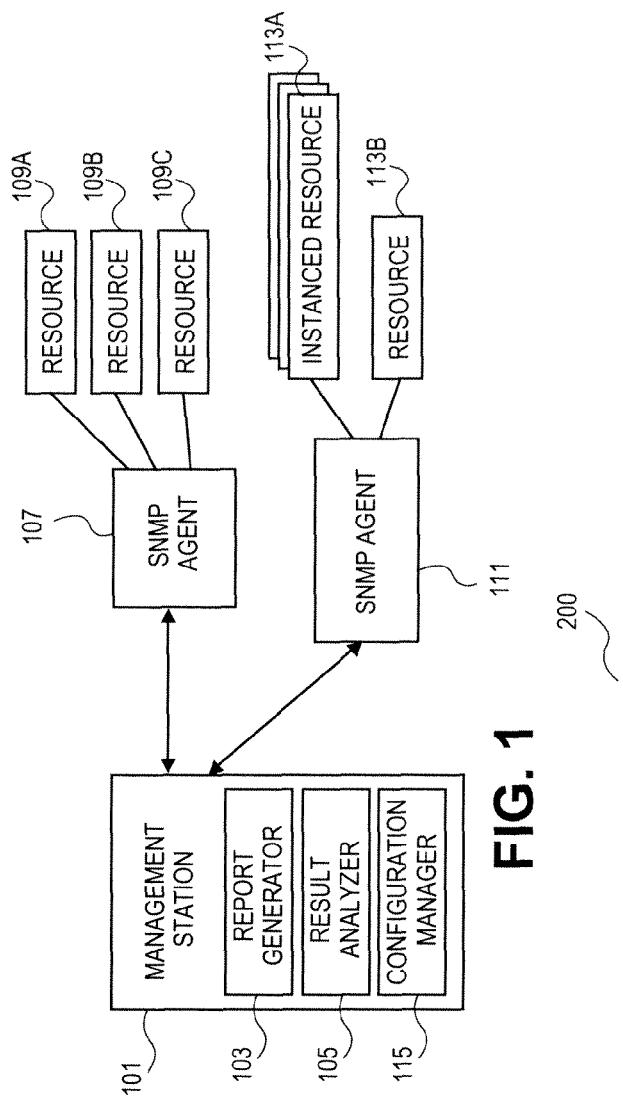

FLEXIBLE SYSTEM MONITORING USING SNMP

TECHNICAL FIELD

Embodiments of the present invention relate to the monitoring of device and resource conditions using the simple network management protocol (SNMP). Specifically, the embodiments of the present invention relate to monitoring resource conditions of multiple instances or resources having a shared object identifier (OID).

BACKGROUND

Simple network management protocol (SNMP) is a system for monitoring and managing computer systems and components over a network. An SNMP management station communicates with SNMP agents that directly monitor or control devices or components in the system.

The SNMP agents provide access to monitored device data as a set of variables. Device data that can be monitored by an agent can include an amount of free memory in a system and a number of running processes on that system. The SNMP management station can access the monitored device data through a set of defined protocol operations including the GET, GETNEXT and GETBULK protocol operations. The SNMP agent can also send data to the SNMP management agent using the TRAP or INFORM protocol operations.

The data accessible via SNMP is organized into a hierarchy. The hierarchy and other metadata, including the type and description of the variables, are described by management information bases (MIBs). MIBs describe the structure of the monitored data and its position in the hierarchy. The MIBs use a hierarchical namespace containing object identifiers (OID) to identify each monitored variable. Each OID uniquely identifies a variable that can be read via SNMP operations.

The hierarchy of the OID namespace is a tree, the levels of which are defined by different organizations. The highest or top portion of the hierarchy of OID namespace is defined by or assigned to respective standards organizations, while the namespace of a lower portion of OIDs is defined by vendors or other organizations.

The OID is a parameter of the various SNMP operations. Thus, when a user of an SNMP management station want to obtain data about a specific component, the user specifies the OID of that component. The SNMP management station generates the appropriate SNMP operation (GET, GETNEXT GETBULK) to retrieve the data passing the OID as a parameter to the operation. The SNMP agent receives operation, looks up the data using the OID and generates a response with the requested data that is identified by the OID.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 1 is a diagram of one embodiment of a system managed by the simple network management protocol (SNMP).

FIG. 2 is a diagram of one embodiment of tabular SNMP data.

DETAILED DESCRIPTION

Figure 3:
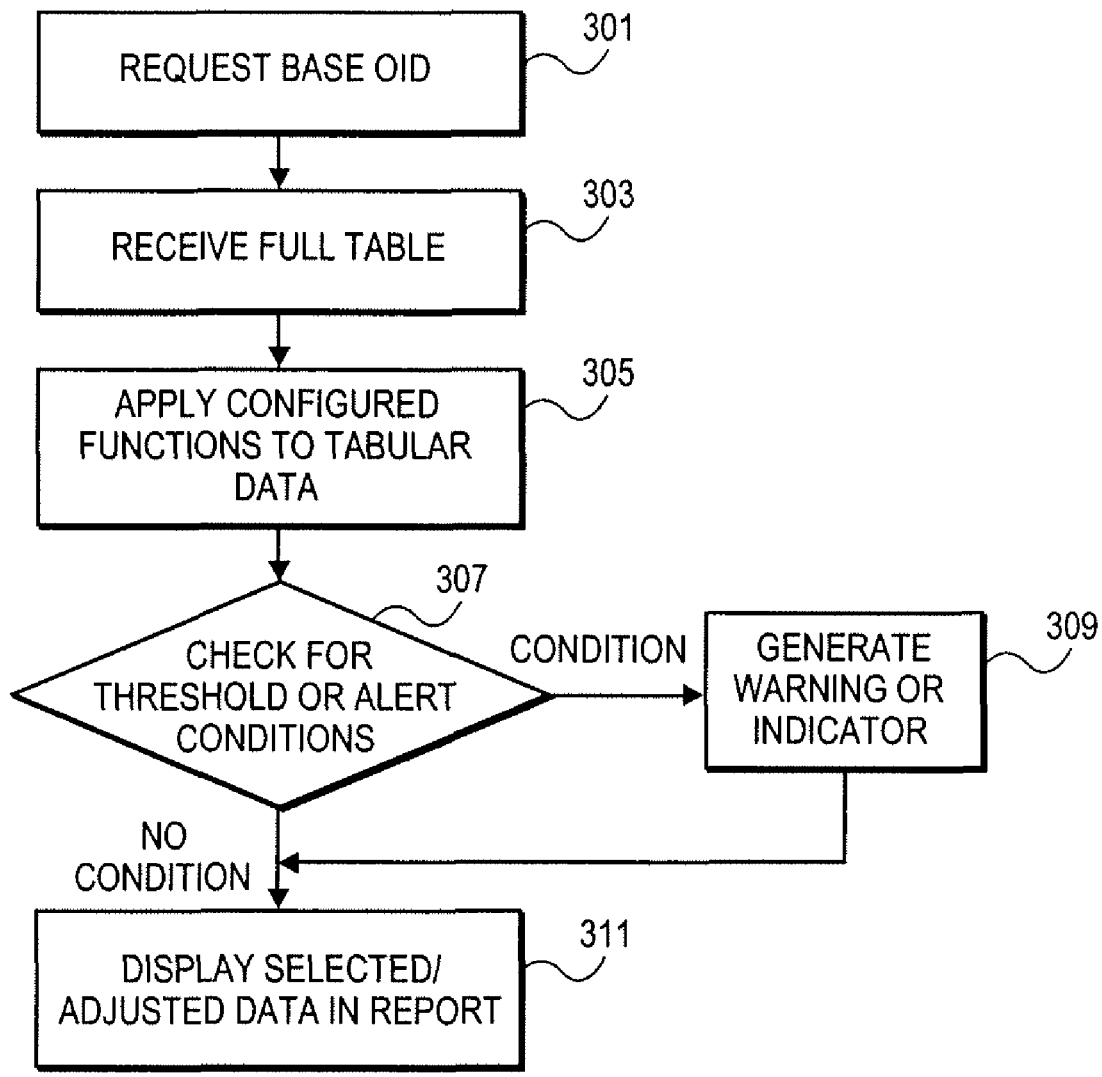
FIG. 3 is a flowchart of one embodiment of a process for tabular data retrieval and processing.

Described herein is a method and apparatus for generating and managing simple network management protocol (SNMP) reports that support the retrieval and processing of tabular data. An SNMP management station or similar program provides a user with an interface for viewing and managing data and resources through SNMP. The data and resources are identified by object identifiers (OID). However, some data referenced by the OIDs is tabular data. The management station provides an interface and set of functions for the configuration of methods for processing and displaying the tabular data. The SNMP management station provides a set of functions including: summation, maximums, minimums, averaging, threshold checks, value comparisons and similar functions that can be applied to the tabular data and used to generate a result or indicator in a management report.

FIG. 1 is a diagram of one embodiment of a system managed by the simple network management protocol (SNMP). The system includes a management station 101, a set of SNMP agents 107, 111 and a set of resources 109A-C, 113A, B and similar components. A 'set,' as used herein, refers to any whole positive number of items including one item. The management station 101, SNMP agents 107, 111 and resources 109A-C, 113A, B can be parts of a single computer system or any number of individual computer systems or other devices in communication with one another over a network. The network can be any type or combination of network types including a local area network (LAN), a wide area network (WAN) (e.g., the Internet), a wireless network or similar network communication systems. The computers hosting the management station 101 and SNMP agents 107, 111 can be desktop computers, servers, network appliances or similar devices. The resources monitored by the SNMP agents 107, 111 can include a wide array of devices, device components and resources within these devices and device components. Examples of resources or information about resources that can be monitored include: an amount of free memory in a device, a number of running processes in a device, operating status of a device, bandwidth utilization, a temperature of a device, a charge level of a device, and other types and categories of resources and resource information within computing, network and associated devices. Any number of different resources or amount of resource information can be tracked by an SNMP agent 107, 111 or SNMP management station 101.

A management station 101, can be a program or component of a computer device that provides a user with an interface for viewing monitored information about and managing networked resources and devices using SNMP. The management station 101 can send and receive data from any number of SNMP agents 107, 111. The management station 101 can also track or monitor local resources directly. The management station 101 can include a report generator 103, a result analyzer 105, a configuration manager 115 and similar components.

The report generator 103 organizes monitored data from the SNMP agents 107, 111 and displays the information as a report to a user. The data to be displayed can be configured by the user through the configuration manager 115. An example report is discussed below in regard to FIG. 4. The report generator 103 can track data sent by the SNMP agents 107, 111 and generate requests for data to be sent to the SNMP agents 107, 111 to replace stale data or obtain missing data necessary for a report. The data received from the SNMP agents 107, 111 can be sent to a results analyzer 105 to prepare it for display dependent on the requirements of each report. The report generator 103 can manage and display any number of different reports as defined by a user or any default reports provided by a programmer.

In addition to generating basic reports for display to the user, the report generator 103 can generate alerts in the form of electronic messages, icons embedded in reports, signals, device activation or inactivation commands and similar actions. These alerts can be configured by a user to be triggered in response to a set of conditions defined by the user. The report generator 103 can use the result analyzer 105 to determine whether values, especially in a set of tabular data, meet the defined conditions for generating the alerts.

The result analyzer 105 receives a set of data retrieved from an SNMP agent 107, 111 as scalar data or in a tabular form. The result analyzer 105 applies any number and combination of functions to the results to produce a desired result to be utilized in a report by the report generator 103. Examples of functions that can be applied by the result analyzer 105 include finding a minimum value in a table, finding a maximum value in a table, summing the values of a table, averaging the values of a table, comparing values of a table to each other or to a threshold value and similar functions and combinations thereof. These functions can also be applied to multiple scalar data inputs or across multiple tables or any combination thereof.

The configuration manager 115 is a component of the management station 101 that provides an interface for a user to define reports including the selection of the set of operations provided by the results analyzer 105 to apply to the data retrieved from SNMP agents 107, 111. The configuration manager 115 can provide a set of menus or similar user interface elements to allow a user to easily select from and combine available functions to data received from the SNMP agents 107, 111. The configuration manager 115 provides a user with menu options (or similar interface options) to select each data input from the SNMP agents 107, 111, any combination of available functions and conjunctive logic to combine the functions or results with one another to define a larger function or algorithm.

The SNMP agents 107, 111 are programs or devices that can be part of a separate computer from the management station 101 or a part of the same computer as the management station 101. The SNMP agents 107, 111 interact with and monitor respective sets of resources 109A-C, 113A,B. The SNMP agents 107, 111 can interact with the resources through any protocol or communication system appropriate for that resource or can be in communication with a set of sensors or similar detectors attached to or part of the resources.

In one example embodiment, an SNMP agent 107 monitors a set of back up batteries or power supplies 109A-C. Each power supply 109A-C may be tracked and its characteristics or tracked values may have a separate OID. However, in another embodiment, the SNMP agent 107 may track the power supply characteristics using a single base OID. The management station 101, when requesting data regarding the power supply utilizes the OID to identify the entire set of power supplies. The SNMP agent 107 then provides a table in response to the request. An example table is discussed below in regard to FIG. 2. The table contains a set of values, each corresponding to a particular power supply. However, the correlation with particular power supplies is not a part of the table.

In another example embodiment, an SNMP agent 111 monitors a set of resources 113A, B of a virtual machine (e.g., a JAVA virtual machine, by Sun Microsystems of Santa Clara, Calif.). Each resource 113A,B has its own OID that allows the management station to individually access the information through the SNMP agent 111. For example, a first resource 113A may be a garbage collector for the virtual machine and a second resource 113B may be a number of running processes in the virtual machine. However, in some cases a single resource 113A has multiple instances. In this example, multiple garbage collection instances are executed by the virtual machine over time. Each instance is an entry in a table that is accessible using the OID of the resource. There is no particular correspondence that is discernible from the table data between the values of the table and particular garbage collection instances.

FIG. 2 is a diagram of one embodiment of tabular SNMP data. The tabular data is organized as a set of OID and value pairs 201A-E,203A-E. SNMP does not define any semantics for tabular data. Thus, depending on the SNMP agent and resource being monitored each entry in a table can represent anything from discrete backup battery temperatures to instances of a virtual machine garbage collection. The entries do not have any required order or guarantees of validity. For example, if used to track separate instances of a garbage collector in a virtual machine, each entry may be assigned as the instance is created. However, the instance may subsequently be terminated without removing the entry from the table. Thus, the size of the table is variable over time and may include stale data.

The OIDs 201A-E are the base OID for the resource plus an appended value. An example OID is 1.3.6.1.4.1.42.2.145.3.163.1.1.2.101.1.3, which corresponds to a table of values that represent the milliseconds spent in garbage collection for the Sun Microsystems Java virtual machine. Another example OID is 1.3.6.1.4.1.318.1.1.1.2.2.2, which corresponds to a table of battery temperatures for Powernet by APC of West Kingston, R.I. An example of a non-table OID is 1.2.3.4.1.1 (a non-standard OID), which corresponds to the number of active threads of the Jboss application server by Red Hat, Inc. of Raleigh, N.C.

Each entry has a unique value appended to the OID to give each entry a unique identifier. The appended values may be a numerical sequence 0 . . . n, where n is the total number of entries ever created for the table or similar values. The OIDs and appended values 201A-E can identify any monitored or operational data 203A-E related to a device, examples of which were discussed above However, the appended values are unknown to the management station and the correlation of each entry and OID with appended value to particular resources is also not known to the management station.

The values 203A-E identified by the OIDs and appended values 201A-E are typically scalar data. However, the type of data is dependent on the resource monitored as discussed above. Each value 203A-E is accessible using the OID and appended value 201A-E. Thus, the management station can derive useful information from the tabular data through the application of the user defined functions and algorithms even though exact correspondence of the information is not determinable. For example, tabular data for a set of power supplies representing the current temperature of each power supply can be filtered using the maximum value function to determine the highest temperature for the set of power supplies.

This information is useful, despite the lack of information about which particular power supply has the highest temperature.

Prior management station programs when querying data stored in tabular form simply displayed the first value of the tabular data in reports and were unable to perform any meaningful examination of the tabular data to improve the utility of the data to the user.

FIG. 3 is a flowchart of one embodiment of a process for tabular data retrieval and processing. This process may be executed by a management station through its report generator, result analyzer and similar components. The process may be executed on a schedule set up by a user or in response to the viewing or requested viewing of a report. In one embodiment, the process is initiated by generating a request (e.g., using an SNMP GET operation) for data identified by an OID (block 301). In another embodiment, the SNMP agents are periodically polled or configured to send the required data.

In response to the SNMP request, the SNMP agent provides tabular data in the format discussed above in regard to FIG. 2 (block 303). The report generator then determines the set of functions to apply to the returned data to prepare a report for the user (block 305). The report generator may retrieve a configuration file or interact with a configuration manager to determine how to handle the returned data. Any number of functions can be designated to be applied to the tabular data. For example, in an embodiment where the tabular data entries represent separate backup batteries and the current temperature of each battery, the user may have configured the report to determine the average temperature, the highest temperature and the lowest temperature. This data is more useful to the user than the single temperature value in the first entry that would have otherwise been displayed. Also, this data is filtered to provide the most important information to the user so that the user does not have to examine each value in the table.

A check can also be made to determine whether any of the returned values or the analyzed results exceed a threshold or trigger similar user defined conditions (block 307). Any number of comparisons can be made with any number or combination of values to make a single determination or multiple separate determinations. For example, separate checks can be made to determine if a set of temperature values exceed low and high temperature thresholds. If any specified conditions are met then an alert or indicator is generated (block 309). An alert can be a electronic message such as an e-mail, text message (SMS or MMS) or similar communication. An indicator can be an icon or similar image displayed in a report to highlight that the specified condition has been met such as with a display of a red flag or green arrow.

If no conditions are met or after the alert or indicators have been determined, the tabular data, results of the analysis of the tabular data or combinations thereof are displayed in a report as configured by a user, programmer or similar entity (block 311). In another embodiment, the data is stored in a local storage device or memory for later use in a report or set of reports.

Figure 4:
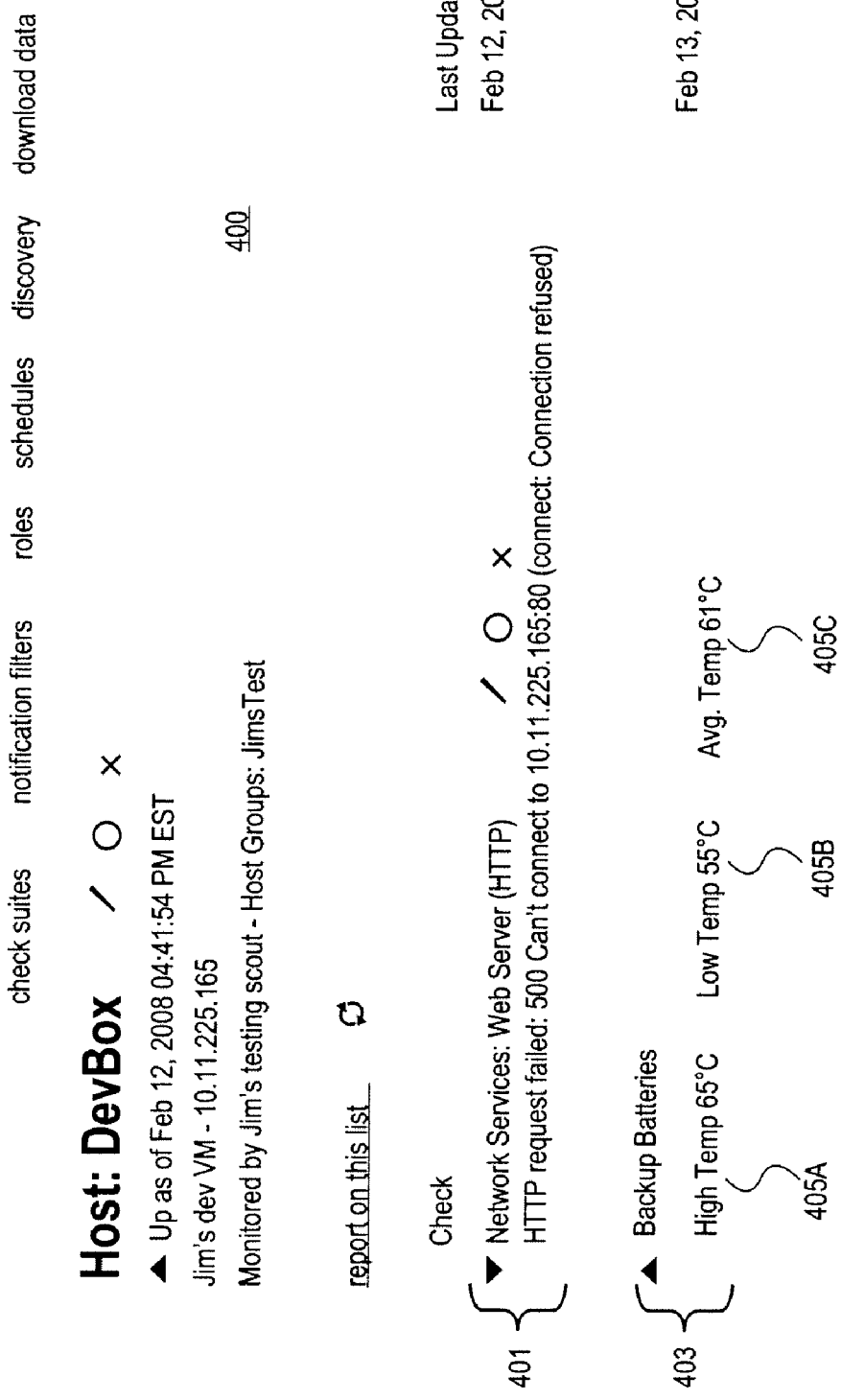
FIG. 4 is a diagram of one embodiment of an SNMP report.

FIG. 4 is a diagram of one embodiment of an SNMP report. The report 400 is an example of a report showing a network service status 401 and a battery backup system status 403. The report can have any format, arrangement or layout. Any number or combination of monitored elements can be included in a report. The illustrated report is provided by way of example and one skilled in the art would understand that the principles, structures and elements of the report can be applied and utilized in other contexts to create reports suitable for those contexts.

The network service report item 401 shows that a web server could not be reached and may be offline. The backup battery report item 403 provides a set of data points derived from tabular data including a high temperature reading 405A, a low temperature reading 405B, and an average temperature 405C. These elements were derived from tabular data that included the temperature of each of six batteries in the example backup battery array. The high temperature value was obtained using a maximum value function, the low temperature value was obtained using a minimum value function and the average temperature was obtained using an average value function.

An indicator 407 is displayed indicating that no alert has been generated. The indicator is an up arrow. This indicator represent an acceptable operating condition. A down arrow or flashing down arrow would have indicated that the temperatures were outside an acceptable user defined operating range. In other embodiments, any indicator type or scheme can be used to represent conditions or the lack of those conditions defined by a user. Also, alerts such as electronic message can be generated when these conditions are met. These electronic messages can be accessible through the report interface by providing a link to a copy of the sent message data along with information about when the data was sent and to whom the data was sent.

Figure 5:
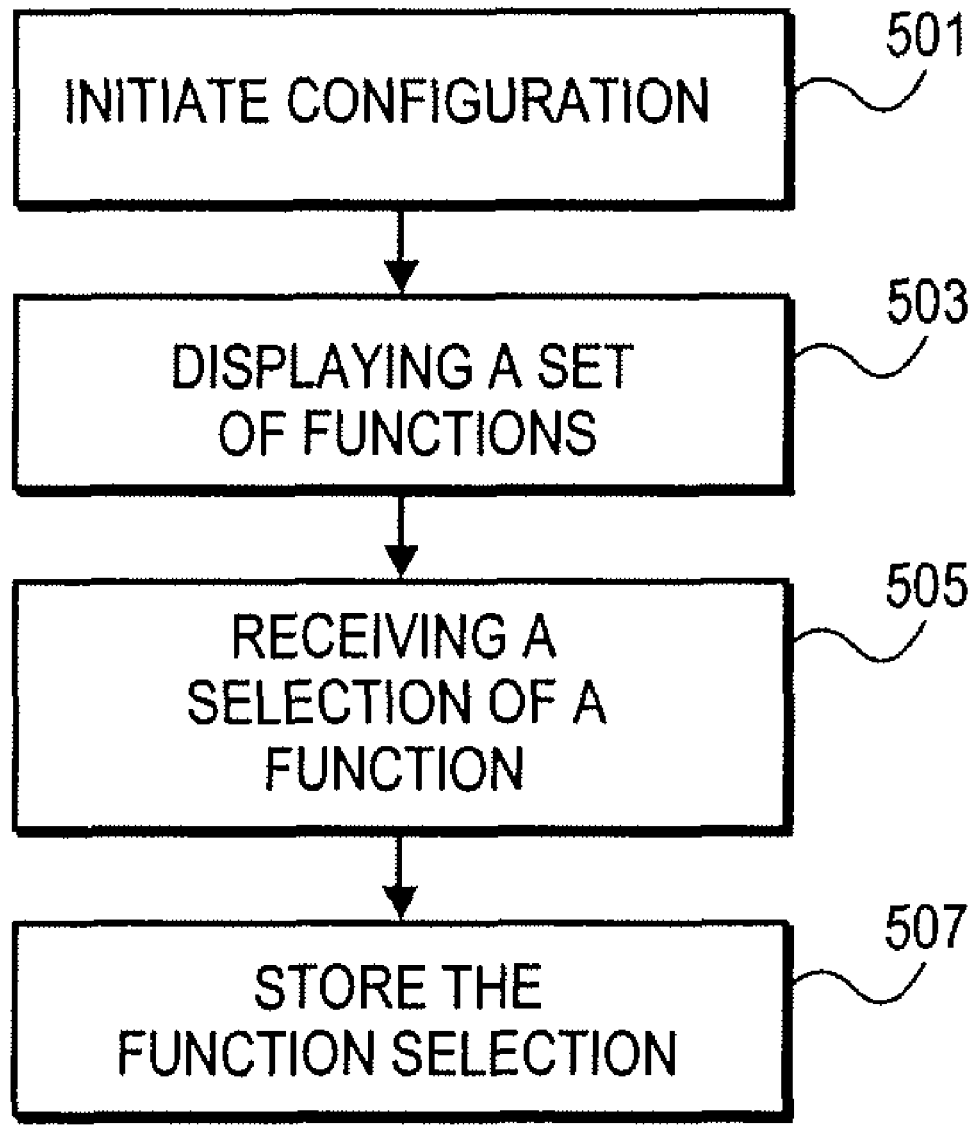
FIG. 5 is a flowchart of one embodiment of a process for SNMP resource monitoring configuration.

FIG. 5 is a flowchart of one embodiment of a process for SNMP resource monitoring configuration. In one embodiment, this process is executed by the monitoring station through the configuration manager or similar component. The process can be initiated by a user opening a configuration menu or during the addition or configuration of a new device or resource in the system (block 501). The configuration manager can provide report layout, arrangement and similar functionalities.

The configuration manager can display a set of operations to be applied to a new resource to be monitored (block 503). The display or operations can be through a menu or similar user interface element. The configuration manager can limit the set of displayed operations depending on the type of resource to be monitored. Any number or combination of operations can be selected. In another embodiment, a user or programmer specifies the operations through a command sequence, set of instructions, boolean logic or similar methods. The configuration manager records the selections of the user defining the operations to be applied to the resource (block 505). The selection of operations can also include the defining of alert conditions. The selection of alert conditions and the application of functions is not restricted to individually monitored resources. Rather, the operations and conditions can be applied across multiple monitored resources as well as utilized with any number of values derived from the monitored resources. The recorded configuration is then stored in a configuration file or similarly made available to the report generator and result analyzer components (block 507).

Figure 6:
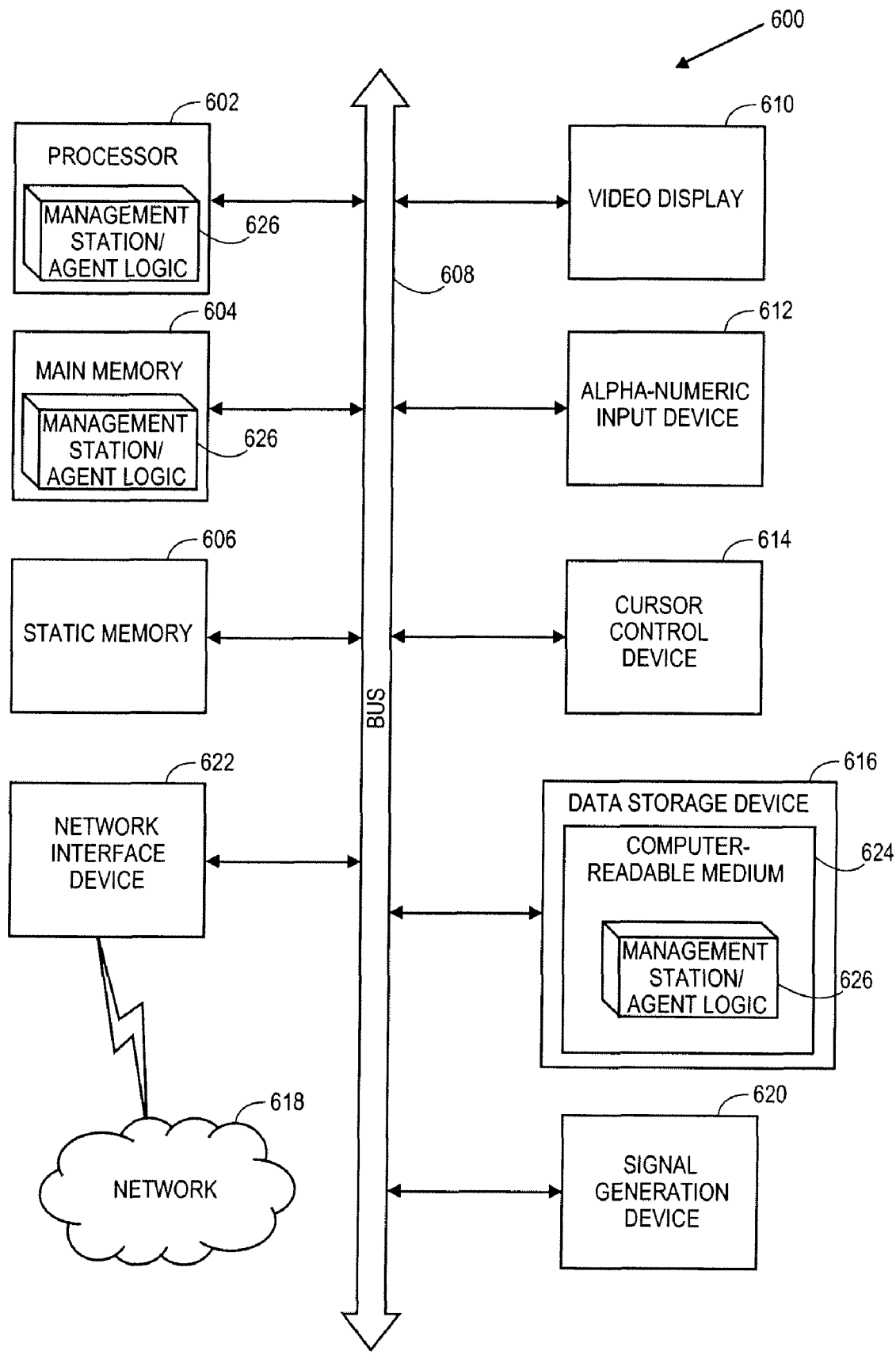
FIG. 6 is a diagram of one embodiment of a computer system providing a management station or agent logic.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine (e.g., the computer executing the SNMPT agent or the server executing the SNMP management station) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable medium), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the management station logic or agent logic 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., management station logic or agent logic 626) embodying any one or more of the methodologies or functions described herein. The logic 626 may also reside, completely or at least partially, within the main memory 604 and/or within the processing device 602 during execution thereof by the computer system 600, the main memory 604 and the processing device 602 also constituting machine-readable storage media. The logic 626 may further be transmitted or received over a network 618 via the network interface device 622.

The machine-readable storage medium 624 may also be used to store the management station logic and agent logic 626 persistently. While the machine-readable storage medium 624 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for managing the presentation and processing of SNMP data has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
generating, by management station executed by computer system, a simple network management protocol (SNMP) request for information of a resource, the request comprising base object identifier (OID) for the resource, wherein the information comprises tabular data organized as a set of OID and value pairs, wherein the OIDs of the set of OID each comprises the base OID for the resource and an appended value, wherein the appended values are a numerical sequence representing a total number of entries of the tabular data for the resource;
receiving, by the management station, the tabular data in response to the request;
applying a user specified function to the values of the tabular data by a result analyzer of the management station; and
displaying a result of the user specified function by the management station.

2. The computer-implemented method of claim 1, wherein the user specified function performs any one of identifying a maximum value in the tabular data, identifying a minimum value in the tabular data, comparing one of the values to a threshold, summing a plurality of the values or averaging the values.

3. The computer-implemented method of claim 1, further comprising generating an alert based on a result of the user specified function.

4. The computer-implemented method of claim 1, further comprising displaying a plurality of values derived from the tabular data.

5. The computer-implemented method of claim 1, further comprising receiving a selection of the function from the user.

6. The computer-implemented method of claim 5, further comprising storing the selection in a configuration profile.

7. The computer-implemented method of claim 1, further comprising displaying a set of functions to apply to one or more of the values of the tabular data through the management station.

8. The computer-implemented method of claim 1, further comprising displaying an icon selected based on the result in a report of the management station.

9. The computer-implemented method of claim 1, further comprising generating a message to notify the user of the result.

10. The method of claim 1, wherein the appended values are unknown to the management station prior to said receiving the tabular data and the correlation of each of the appended values to a particular resource is unknown to the management station prior to said receiving the tabular data.

11. A computer readable storage medium, having instructions stored therein, which when executed, cause a computer to perform a set of operations comprising:
generating, by a management station, a simple network management protocol (SNMP) request for information of a resource, the request comprising a base object identifier for the resource, wherein the information comprises tabular data organized as a set of OID and value pairs, wherein the OIDs of the set of OID each comprises the base OID for the resource and an appended value, wherein the appended values are a numerical sequence representing a total number of entries of the tabular data for the resource;
receiving, by the management station, the tabular data in response to the request;
applying a user specified function to the tabular data by a result analyzer of the management station; and
displaying a result of the user specified function by the management station.

12. The computer readable storage medium of claim 11, wherein the user specified function performs any one of identifying a maximum value in the tabular data, identifying a minimum value in the tabular data, comparing one of the values to a threshold, summing a plurality of the values or averaging the values.

13. The computer readable storage medium of claim 11, having further instructions therein, which when executed, cause the computer to perform a further set of operations, further comprising generating an alert based on a result of the user specified function.

14. The computer readable storage medium of claim 11, having further instructions therein, which when executed, cause the computer to perform a further set of operations, further comprising displaying a plurality of values derived from the tabular data.

15. The computer readable storage medium of claim 11, having further instructions therein, which when executed, cause the computer to perform a further set of operations, further comprising receiving a selection of the function from the user.

16. The computer readable storage medium of claim 15, having further instructions therein, which when executed, cause the computer to perform a further set of operations, further comprising storing the selection in a configuration profile.

17. The computer readable storage medium of claim 11, having further instructions stored therein, which when executed perform a set of operations, further comprising displaying a set of functions to apply to one or more of the values of the tabular data through the management station.

18. The computer readable storage medium of claim 11, having further instructions stored therein, which when executed perform a set of operations, further comprising displaying an icon selected based on the result in a report of the management station.

19. A system comprising:
a management station to manage a plurality of agents using SNMP, the management station comprising,
a report generator to display data of the plurality of agents, wherein the data of the plurality of agents is stored as tabular data organized as a set of OID and value pairs, wherein each of the OIDs of the set comprises a base OID for the resource and an appended value, wherein the appended values are a numerical sequence representing a total number of entries of the tabular data for the resource; and a result analyzer to apply a user selected function to the values of tabular data received from one of the plurality of agents at the resource.

20. The system of claim 19, wherein the function is any one of a maximum, minimum, average, threshold comparison or summation.

21. The system of claim 19, wherein the report generator displays a plurality of values derived from the tabular data.

* * * * *